(12) United States Patent
Liang et al.

(10) Patent No.: US 11,305,835 B2
(45) Date of Patent: Apr. 19, 2022

(54) BRAKE MODULE

(71) Applicant: Wistron Corp., New Taipei (TW)

(72) Inventors: Chen Yi Liang, New Taipei (TW); Yu-Ju Liu, New Taipei (TW)

(73) Assignee: WISTRON CORP., New Taipei (TW)

(*) Notice: Subject to any disclaimer, the term of this patent is extended or adjusted under 35 U.S.C. 154(b) by 444 days.

(21) Appl. No.: 16/373,287

(22) Filed: Apr. 2, 2019

(65) Prior Publication Data

US 2020/0108888 A1    Apr. 9, 2020

(30) Foreign Application Priority Data

Oct. 8, 2018 (TW) ................................ 107135350

(51) Int. Cl.
| | |
|---|---|
| *B62L 3/08* | (2006.01) |
| *B62L 3/02* | (2006.01) |
| *B62L 1/06* | (2006.01) |
| *B62L 5/00* | (2006.01) |

(52) U.S. Cl.
CPC .......... *B62L 3/08* (2013.01); *B62L 1/06* (2013.01); *B62L 3/02* (2013.01); *B62L 5/006* (2013.01)

(58) Field of Classification Search
CPC .... B62L 5/006; B62L 3/02; B62L 1/06; B62L 3/08
USPC ....................................................... 188/24.16
See application file for complete search history.

(56) References Cited

U.S. PATENT DOCUMENTS

| | | | | | |
|---|---|---|---|---|---|
| 3,942,609 | A | * | 3/1976 | Hill ........................... | B62L 3/08 188/24.16 |
| 4,057,127 | A | * | 11/1977 | Woodring ................ | B62L 3/08 188/24.16 |
| 4,205,735 | A | * | 6/1980 | Murray .................. | B60T 8/3205 188/16 |
| 4,480,720 | A | * | 11/1984 | Shimano .................. | B62L 3/08 188/2 D |
| 4,773,510 | A | * | 9/1988 | Sato ........................ | B62L 3/08 188/24.16 |
| 5,431,255 | A | * | 7/1995 | Tsuchie .................... | B61L 3/08 188/2 D |
| 5,505,105 | A | * | 4/1996 | Kuo ......................... | B62L 1/14 188/2 D |
| 5,829,314 | A | * | 11/1998 | Scura ..................... | F16C 1/101 74/502.4 |

(Continued)

FOREIGN PATENT DOCUMENTS

| | | |
|---|---|---|
| TW | 367959 U | 8/1999 |
| TW | M516001 U | 1/2016 |

*Primary Examiner* — Robert A. Siconolfi
*Assistant Examiner* — James K Hsiao

(57) ABSTRACT

A brake module is provided. The brake module includes a first brake lever, a second brake lever, a moveable member, a first cable, a second cable, a first brake unit, a second brake unit, a third cable and a fourth cable. The first cable connects the first brake lever and the moveable member. The second cable connects the second brake lever and the moveable member. The third cable connects the first brake unit and the moveable member. The fourth cable connects the second brake unit and the moveable member. When a lever force is applied to the first cable or the second cable, the third cable applies a first brake force to the first brake unit, the fourth cable applies a second brake force to the second brake unit, and the lever force is smaller than the sum of the first brake force and the second brake force.

15 Claims, 10 Drawing Sheets

(56) References Cited

U.S. PATENT DOCUMENTS

| | | | | |
|---|---|---|---|---|
| 5,927,442 A * | 7/1999 | Liao | ............................ | B62L 3/08 188/24.16 |
| 6,098,486 A * | 8/2000 | Liao | ............................ | B62L 3/00 188/24.11 |
| 6,212,969 B1 * | 4/2001 | Kuo | ............................ | A61H 3/04 188/19 |
| 6,244,392 B1 * | 6/2001 | Brady | ............................ | B62L 1/06 188/24.12 |
| 6,247,379 B1 * | 6/2001 | Chen | ............................ | B62L 3/02 74/489 |
| 6,305,238 B1 * | 10/2001 | Gabas | ............................ | B60T 11/04 403/13 |
| 6,311,805 B1 * | 11/2001 | Juan | ............................ | B60T 11/06 188/2 D |
| 6,463,825 B2 * | 10/2002 | Lee | ............................ | A61H 3/04 74/501.6 |
| 6,523,649 B1 * | 2/2003 | Juan | ............................ | B60T 11/06 188/2 D |
| 6,634,467 B2 * | 10/2003 | Liu | ............................ | B60T 11/046 188/2 D |
| 6,817,451 B1 * | 11/2004 | Chen | ............................ | B62B 5/0438 188/19 |
| 6,942,258 B2 * | 9/2005 | Roos | ............................ | E05B 77/26 292/201 |
| 7,222,874 B1 * | 5/2007 | Liu | ............................ | B60T 7/102 188/19 |
| 7,249,661 B2 * | 7/2007 | Becocci | ............................ | B60T 11/046 188/24.16 |
| 7,445,092 B2 * | 11/2008 | Tachiiri | ............................ | B60T 13/746 188/2 D |
| 7,484,432 B2 * | 2/2009 | Yamanaka | ............................ | B60T 11/046 188/2 D |
| 8,210,322 B2 * | 7/2012 | Guh | ............................ | B60T 11/046 188/24.22 |
| 8,261,887 B2 * | 9/2012 | Tseng | ............................ | B60T 11/06 188/24.22 |
| 8,297,147 B2 * | 10/2012 | Wu | ............................ | A47C 7/00 74/502.2 |
| 8,469,156 B2 * | 6/2013 | Lu | ............................ | B62L 3/08 188/24.22 |
| 8,794,391 B2 * | 8/2014 | Tseng | ............................ | B62L 3/08 188/24.13 |
| 8,806,714 B2 * | 8/2014 | Eguchi | ............................ | B60B 33/0092 16/35 R |
| 8,905,422 B2 * | 12/2014 | Inoue | ............................ | B60T 8/261 280/281.1 |
| 9,004,234 B2 * | 4/2015 | Chang | ............................ | B60T 11/06 188/24.22 |
| 9,090,308 B2 * | 7/2015 | Chiang | ............................ | B60T 7/102 |
| 9,284,757 B2 * | 3/2016 | Kempel | ............................ | E05B 83/26 |
| 9,493,146 B1 * | 11/2016 | Tseng | ............................ | B62L 3/08 |
| 9,677,648 B2 * | 6/2017 | Wadzinski | ............................ | F16H 7/0827 |
| 10,011,319 B2 * | 7/2018 | Wu | ............................ | B62L 1/005 |
| 2002/0175028 A1 * | 11/2002 | Liu | ............................ | F16C 1/101 188/24.21 |
| 2009/0014258 A1 * | 1/2009 | Tseng | ............................ | B62L 3/08 188/24.16 |
| 2009/0314197 A1 * | 12/2009 | Misson | ............................ | B66C 1/42 114/368 |
| 2010/0230214 A1 * | 9/2010 | Tseng | ............................ | B62L 3/02 188/24.11 |
| 2010/0300817 A1 * | 12/2010 | Chiang | ............................ | B60T 11/06 188/24.16 |
| 2014/0202802 A1 * | 7/2014 | Chang | ............................ | B62L 3/08 188/204 R |
| 2016/0375347 A1 * | 12/2016 | Stubberud | ............................ | A63C 17/0006 701/79 |
| 2017/0334509 A1 * | 11/2017 | Yang | ............................ | B60T 7/10 |
| 2018/0072371 A1 * | 3/2018 | Wu | ............................ | B62L 3/08 |

* cited by examiner

B2

BRAKE MODULE

CROSS REFERENCE TO RELATED APPLICATIONS

This Application claims priority of Taiwan Patent Application No. 107135350, filed on Oct. 8, 2018, the entirety of which is incorporated by reference herein.

BACKGROUND OF THE INVENTION

Field of the Invention

The present invention relates to a brake module, and in particular to a brake module provides a labor saving function.

Description of the Related Art

The design of a conventional brake module is not labor-saving. However, a labor-saving function for the brake module of a walker is required due to the limited grip force of walker's user. Additionally, the user's reaction speed and movement may be slow. There is a demand for the capacity to brake a plurality of wheels with one single brake lever.

BRIEF SUMMARY OF THE INVENTION

In one embodiment, a brake module is provided. The brake module includes a first brake lever, a second brake lever, a moveable member, a first cable, a second cable, a first brake unit, a second brake unit, a third cable and a fourth cable. One end of the first cable is connected to the first brake lever, and the other end of the first cable is connected to the moveable member. One end of the second cable is connected to the second brake lever, and the other end of the second cable is connected to the moveable member. The first brake unit is for braking a first wheel. The second brake unit is for braking a second wheel. One end of the third cable is connected to the first brake unit, and the other end of the third cable is connected to the moveable member. One end of the fourth cable is connected to the second brake unit, and the other end of the fourth cable is connected to the moveable member. When a lever force is applied to the first cable or the second cable, the moveable element pulls the third cable and the fourth cable simultaneously, the third cable applies a first brake force to the first brake unit, the fourth cable applies a second brake force to the second brake unit, and the lever force is smaller than the sum of the first brake force and the second brake force.

In one embodiment, a walker having a first wheel and a second wheel is provided. The walker includes a first brake lever, a second brake lever, a moveable member, a first cable, a second cable, a first brake unit, a second brake unit, a third cable and a fourth cable. One end of the first cable is connected to the first brake lever, and the other end of the first cable is connected to the moveable member. One end of the second cable is connected to the second brake lever, and the other end of the second cable is connected to the moveable member. The first brake unit is for braking the first wheel. The second brake unit is for braking the second wheel. One end of the third cable is connected to the first brake unit, and the other end of the third cable is connected to the moveable member. One end of the fourth cable is connected to the second brake unit, and the other end of the fourth cable is connected to the moveable member. When a lever force is applied to the first cable or the second cable, the moveable element pulls the third cable and the fourth cable simultaneously, the third cable applies a first brake force to the first brake unit, the fourth cable applies a second brake force to the second brake unit, and the lever force is smaller than the sum of the first brake force and the second brake force.

Utilizing the embodiment of the invention, the lever force is smaller than the sum of the first brake force and the second brake force, and the user therefore can brake the wheel with reduced force. Additionally, the user can brake a plurality of wheels by pulling only one brake lever. The brake module of the embodiment can be utilized to walker or other apparatus with wheels.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
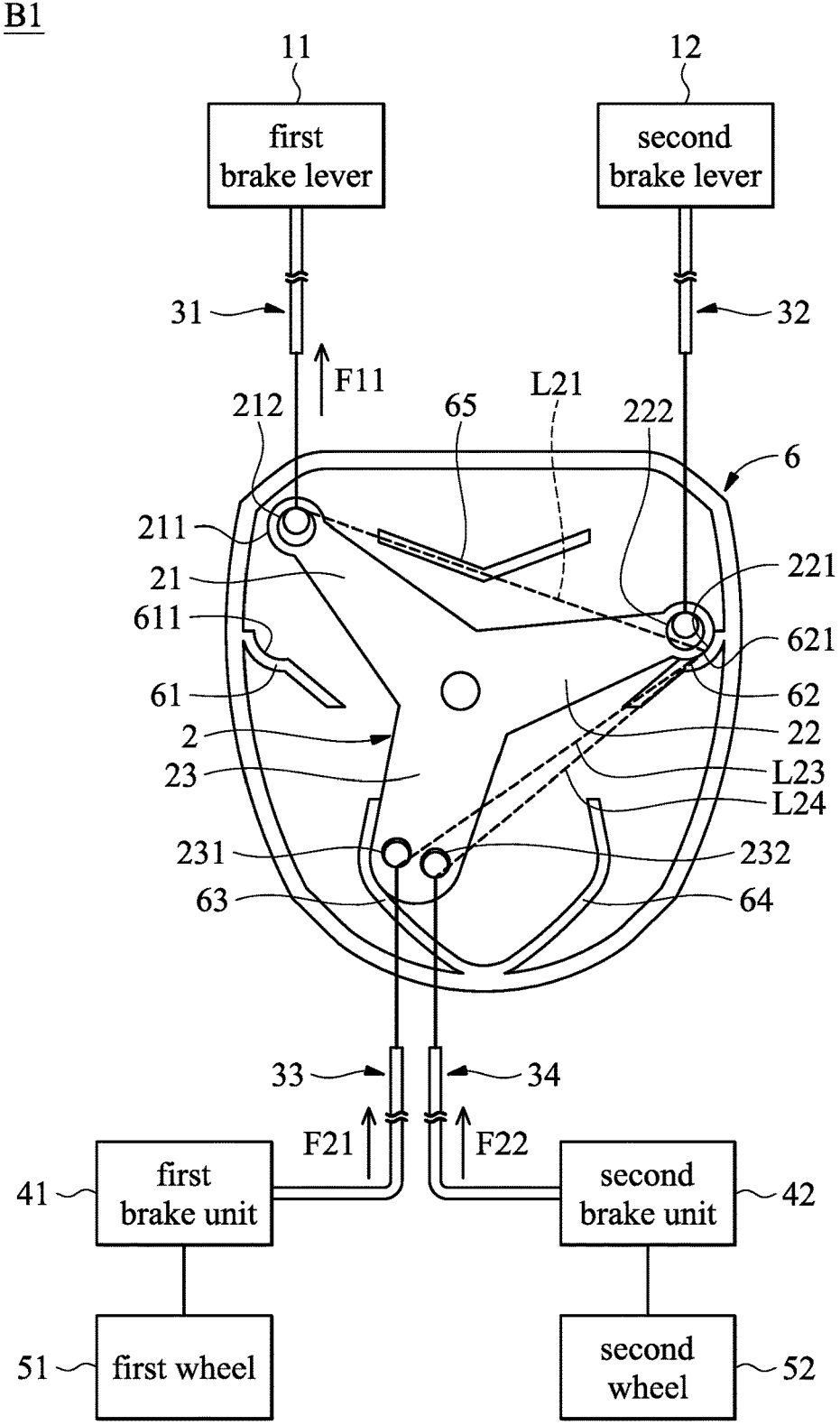
FIG. 1A shows a brake module of a first embodiment of the invention, wherein a lever force is applied to a first cable.

FIG. 1A shows a brake module B1 of a first embodiment of the invention. With reference to FIG. 1A, the brake module B1 of the first embodiment of the invention includes a first brake lever 11, a second brake lever 12, a moveable member 2, a first cable 31, a second cable 32, a first brake unit 41, a second brake unit 42, a third cable 33 and a fourth cable 34. One end of the first cable 31 is connected to the first brake lever 11, and the other end of the first cable 31 is connected to the moveable member 2. One end of the second cable 32 is connected to the second brake lever 12, and the other end of the second cable 32 is connected to the moveable member 2. The first brake unit 41 is used for braking a first wheel 51. The second brake unit 42 is used for braking a second wheel 52. One end of the third cable 33 is connected to the first brake unit 41, and the other end of the third cable 33 is connected to the moveable member 2. One end of the fourth cable 34 is connected to the second brake unit 42, and the other end of the fourth cable 34 is connected to the moveable member 2.

In the embodiments of the invention, the first brake unit 41 and the second brake unit 42 can be drum brake units or brake units of other designs.

When a lever force is applied to the first cable 31 or the second cable 32, the moveable element 2 pulls the third cable 33 and the fourth cable 34 simultaneously. The third cable 33 applies a first brake force to the first brake unit 41. The fourth cable 34 applies a second brake force to the second brake unit 42. The lever force is smaller than the sum of the first brake force and the second brake force. As shown in FIG. 1A for example, when the lever force F11 is applied to the first cable 31, the moveable element 2 pulls the third cable 33 and the fourth cable 34 simultaneously. The third cable 33 applies a first brake force F21 to the first brake unit 41. The fourth cable 34 applies the second brake force F22 to the second brake unit 42. The lever force F11 is smaller than the sum of the first brake force F21 and the second brake force F22.

With reference to FIG. 1A, in details, the brake module B1 further comprises a module housing 6. The module housing 6 comprises a first fulcrum wall 61 and a second fulcrum wall 62. The moveable member 2 comprises a first arm 21, a second arm 22 and third arm 23. The first cable 31 is connected to the first arm 21, the second cable 32 is connected to the second arm 22, the third cable 33 and the fourth cable 34 are connected to the third arm 23, the first fulcrum wall 61 corresponds to the first arm 21, and the second fulcrum wall 62 corresponds to the second arm 22.

Figure 1B:
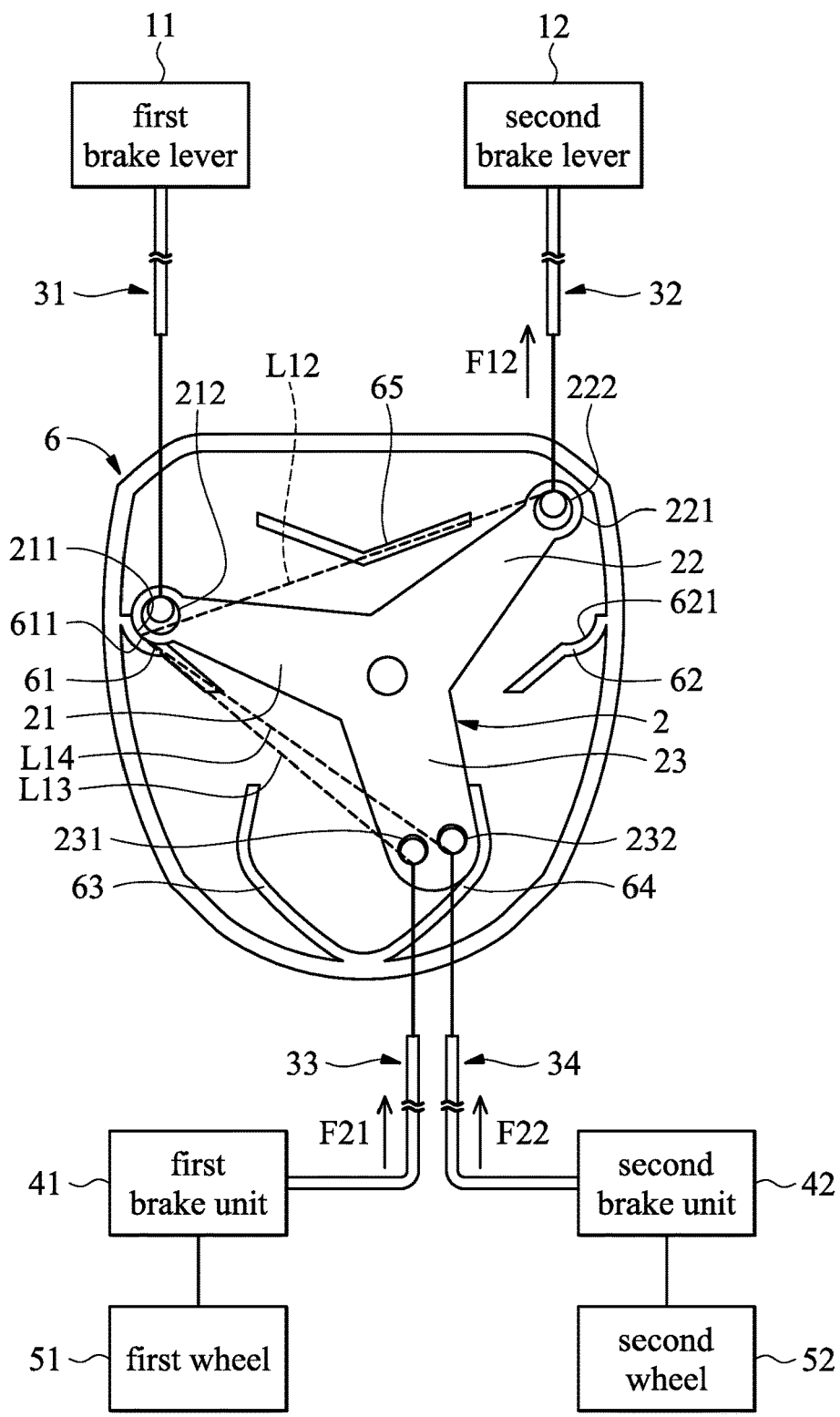
FIG. 1B shows the brake module of the first embodiment of the invention, wherein the lever force is applied to a second cable.

With reference to FIG. 1A, in one embodiment, when only the first brake lever 11 is pulled, the first cable 31 pulls the first arm 21, a second abutting end 221 of the second arm 22 abuts the second fulcrum wall 62, the moveable member 2 rotates around a second contact point between the second abutting end 221 and the second fulcrum wall 62, and the third cable 33 and the fourth cable 34 are pulled. With reference to FIG. 1B, when only the second brake lever 12 is pulled, a lever force F12 is applied to the second cable 32, the second cable 32 pulls the second arm 22, a first abutting end 211 of the first arm 21 abuts the first fulcrum wall 61, the moveable member 2 rotates around a first contact point between the first abutting end 211 and the first fulcrum wall 61, and the third cable 33 and the fourth cable 34 are pulled.

In the embodiment, the second contact point is where the second abutting end 221 contacts the second fulcrum wall 62, the second contact point is changed with the rotation of the moveable member 2. Similarly, the first contact point is where the first abutting end 211 contacts the first fulcrum wall 61, the first contact point is also changed with the rotation of the moveable member 2.

With reference to FIGS. 1A and 1B, in one embodiment, the first fulcrum wall 61 comprises a first recess 611, and the first abutting end 211 is curved. When only the second brake lever 12 is pulled, the first abutting end 211 abuts the first recess 611. The second fulcrum wall 62 comprises a second recess 621, and the second abutting end 211 is curved. When only the first brake lever 11 is pulled, the second abutting end 211 abuts the second recess 621.

With reference to FIGS. 1A and 1B, in one embodiment, the first arm 21 comprises a first connection hole 212. The second arm 22 comprises a second connection hole 222. The third arm 23 comprises a third connection hole 231 and a fourth connection hole 232. The first cable 31 connects the first connection hole 212. The second cable 32 connects the second connection hole 222. The third cable 33 connects the third connection hole 231. The fourth cable 34 connects the fourth connection hole 232. With reference to FIG. 1A, a straight distance L21 between the second abutting end 221 and the first connection hole 212 is greater than a straight distance L23 between the second abutting end 221 and the third connection hole 231. With reference to FIG. 1B, a straight distance L12 between the first abutting end 211 and the second connection hole 222 is greater than a straight distance L14 between the first abutting end 211 and the fourth connection hole 232.

With reference to FIG. 1A, in one embodiment, a straight distance L21 between the second abutting end 221 and the first connection hole 212 is greater than a straight distance L24 between the second abutting end 221 and the fourth connection hole 232. With reference to FIG. 1B, a straight distance L12 between the first abutting end 211 and the second connection hole 222 is greater than a straight distance L13 between the first abutting end 211 and the third connection hole 231.

With reference to FIGS. 1A and 1B, in one embodiment, the module housing 6 comprises a first restriction wall 63 and a second restriction wall 64. With reference to FIG. 1A, when only the first brake lever 11 is pulled, the moveable member 2 rotates around the second contact point between the second abutting end 221 and the second fulcrum wall 62, and the first restriction wall 63 is adapted to abut the third arm 23 to restrict the movement range of the moveable member 2. With reference to FIG. 1B, when only the second brake lever 12 is pulled, the moveable member 2 rotates around the first contact point between the first abutting end 211 and the first fulcrum wall 61, and the second restriction wall 64 is adapted to abut the third arm 23 to restrict the movement range of the moveable member 2.

Figure 2A:
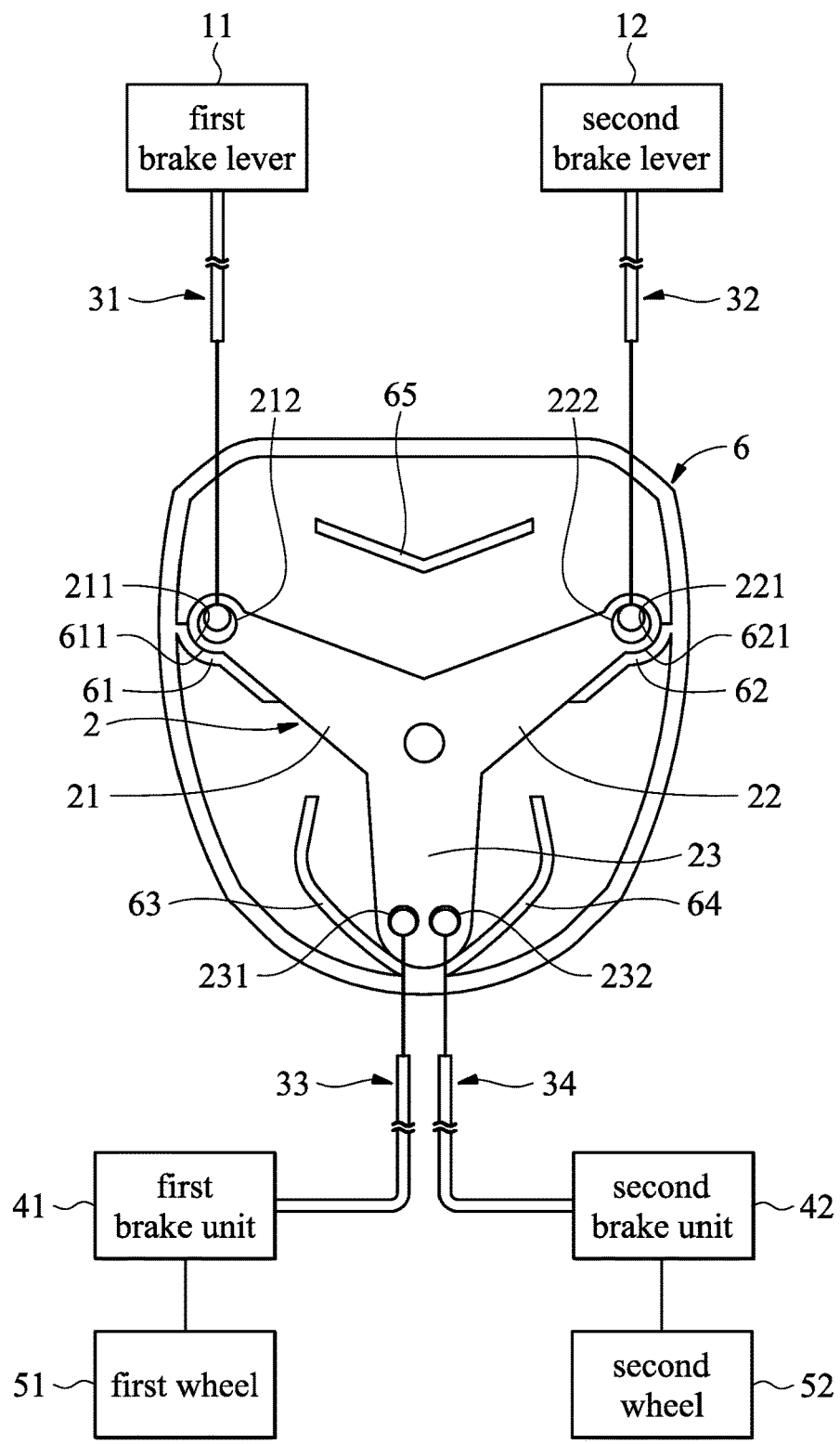
FIG. 2A shows the brake module of the first embodiment of the invention, wherein there is no lever force applied to the first cable and the second cable.
Figure 2B:
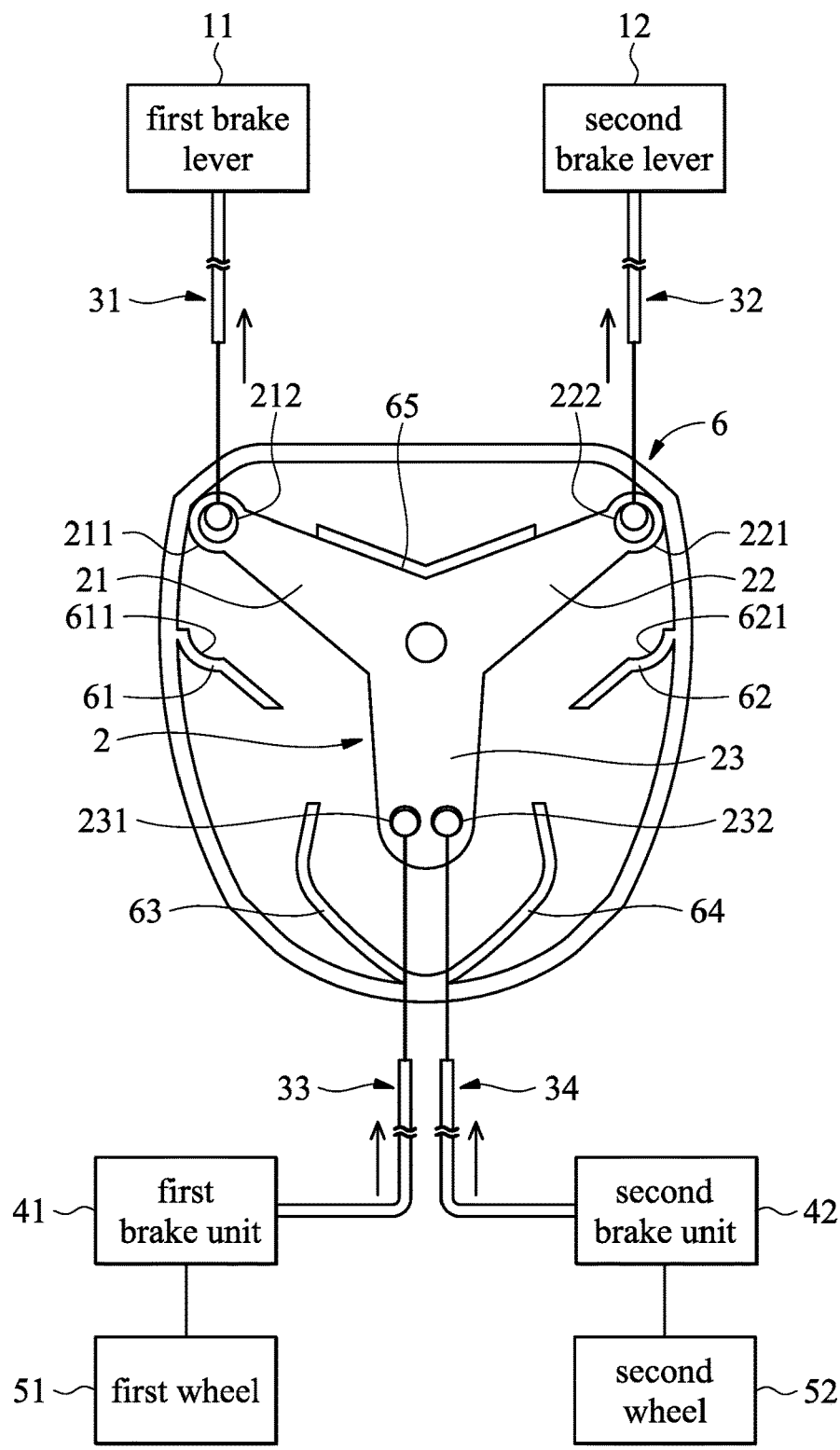
FIG. 2B shows the brake module of the first embodiment of the invention, wherein both of the first cable and the second cable are applied with the lever force.

With reference to FIG. 2A, when there is no force applied to the first brake lever 11 and the second brake lever 12, the moveable member 2 may abut the first restriction wall 63 or the second restriction wall 64, or the moveable member 2 may abut the first restriction wall 63 and the second restriction wall 64 simultaneously. With reference to FIG. 2B, in one embodiment, when the first brake lever 11 and the second brake lever 12 are pulled simultaneously, the first cable 31 pulls the first arm 21, the second cable 32 pulls the second arm 22, and the moveable member 2 is moved to pull the third cable 33 and the fourth cable 34. In one embodiment, the module housing 6 further comprises a third restriction wall 65, and when the first brake lever 11 and the second brake lever 12 are pulled simultaneously, the moveable member 2 is moved, and the third restriction wall 65 is adapted to abut the moveable member 2 to restrict the movement range of the moveable member 2.

With reference to FIG. 1A, in one embodiment, the first fulcrum wall 61 and the second fulcrum wall 62 are symmetric to the center of the module housing 6. The third restriction wall 65 corresponds to the third restriction wall 63 and the second restriction wall 64.

In the embodiment above, the moveable member 2 comprises the first arm 21, the second arm 22 and the third arm 23. However, the disclosure is not meant to restrict the invention. For example, in a modified embodiment, the moveable member comprises a first arm, a second arm, a third arm and a fourth arm. The first cable is connected to the first arm. The second cable is connected to the second arm. The third cable is connected to the third arm. The fourth cable is connected to the fourth arm. The modified embodiment also provides a labor saving function.

Figure 3A:
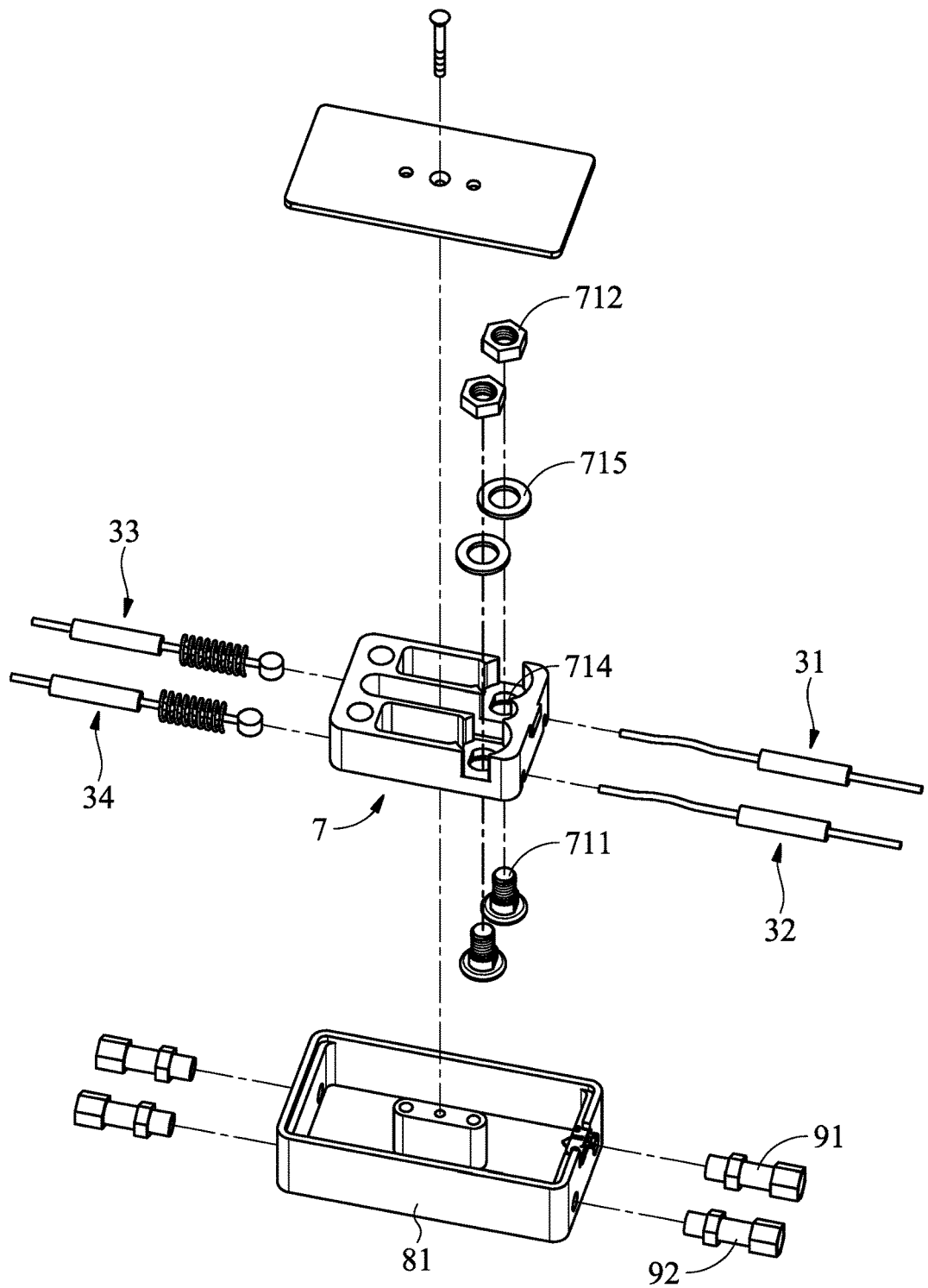
FIG. 3A is an exploded view of a brake module of a second embodiment of the invention.
Figure 3B:
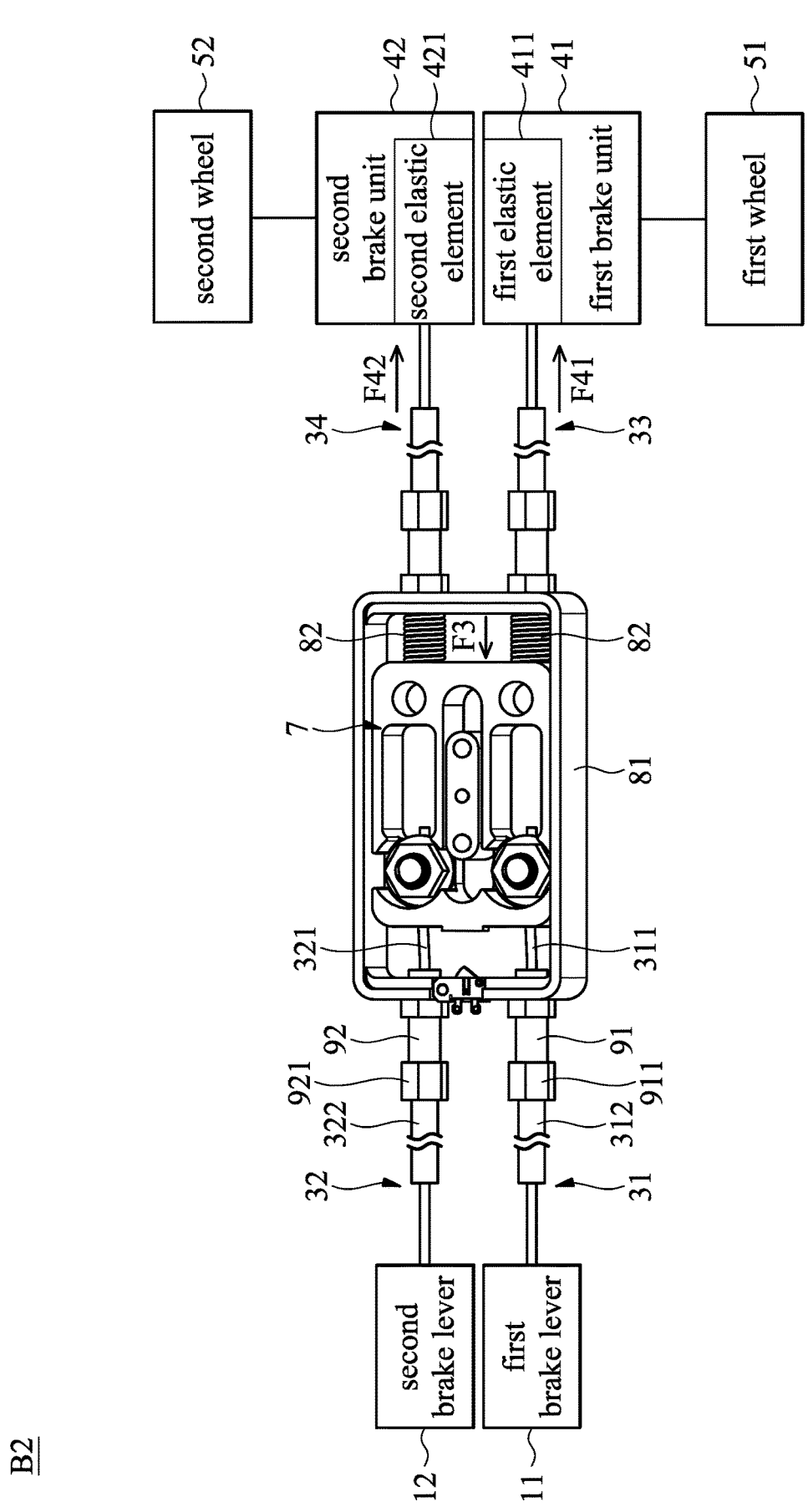
FIG. 3B is an assembled view of the brake module of the second embodiment of the invention, wherein the moveable member is in a first moveable member position in the module housing.
Figure 3C:
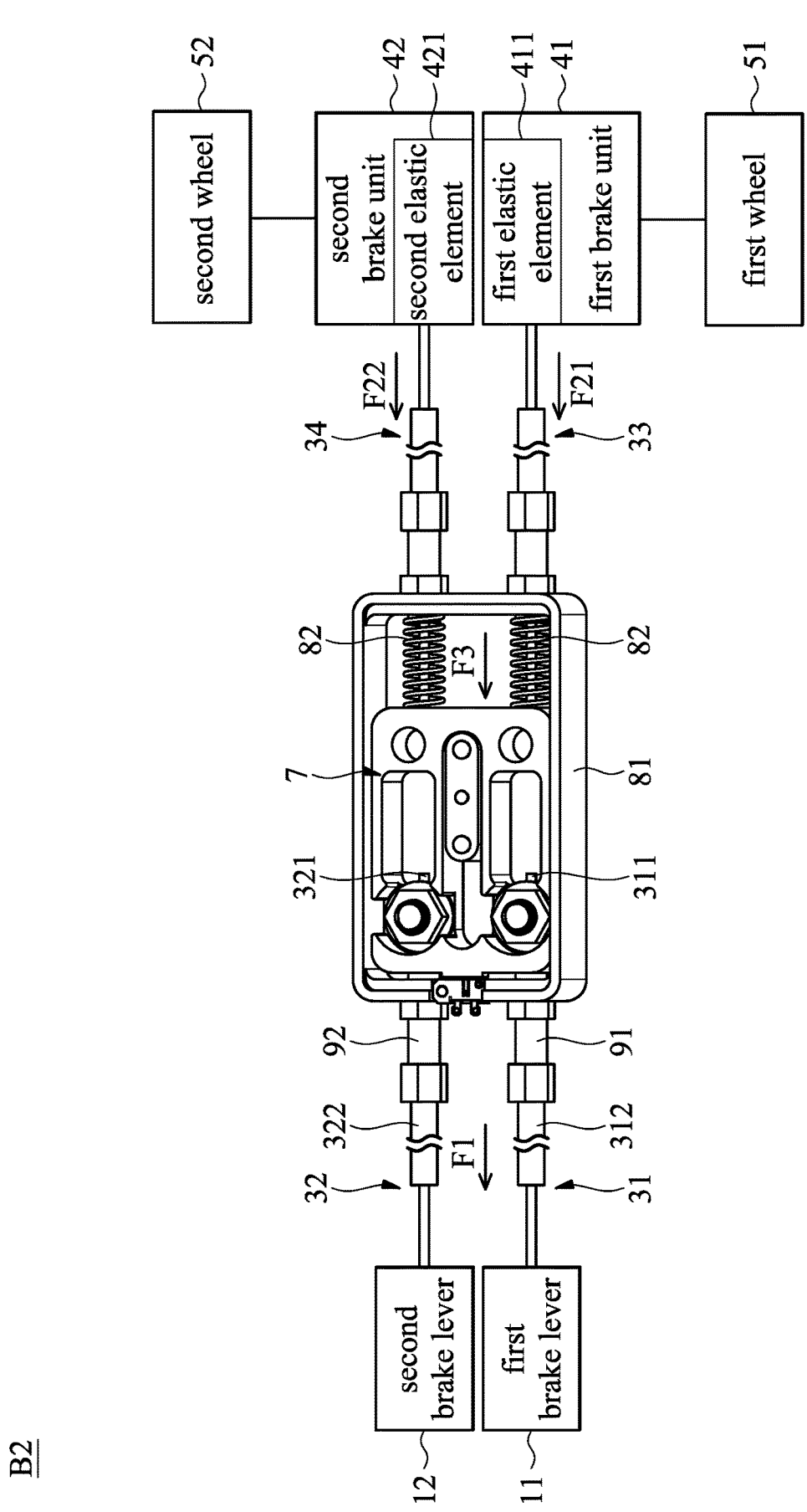
FIG. 3C is an assembled view of the brake module of the second embodiment of the invention, wherein the moveable member is in a second moveable member position in the module housing.

FIG. 3A is an exploded view of a brake module of a second embodiment of the invention. FIGS. 3B and 3C are assembled views of the brake module of the second embodiment of the invention. With reference to FIGS. 3A, 3B and 3C, the brake module B2 of the second embodiment of the invention includes a first brake lever 11, a second brake lever 12, a moveable member 7, a first cable 31, a second cable 32, a first brake unit 41, a second brake unit 42, a third cable 33 and a fourth cable 34. One end of the first cable 31 is connected to the first brake lever 11, and the other end of the first cable 31 is connected to the moveable member 7. One end of the second cable 32 is connected to the second brake lever 12, and the other end of the second cable 32 is connected to the moveable member 7. The first brake unit 41 is used for braking a first wheel 51. The second brake unit 42 is used for braking a second wheel 52. One end of the third cable 33 is connected to the first brake unit 41, and the other end of the third cable 33 is connected to the moveable member 7. One end of the fourth cable 34 is connected to the second brake unit 42, and the other end of the fourth cable 34 is connected to the moveable member 7.

With reference to FIGS. 3A, 3B and 3C, in one embodiment, the brake module B2 further comprises a module housing 81 and an elastic unit 82. The moveable member 7 slides between a first moveable member position (FIG. 3B) and a second moveable member position (FIG. 3C) in the module housing 81. With reference to FIG. 3B, when the moveable member 7 is in the first moveable member position, the first brake lever 11 and the second brake lever 12 provided no lever force. With reference to FIG. 3C, when the first brake lever 11 or the second brake lever 12 provides the lever force F1, the moveable member 7 is moved to the second moveable member position, the third cable 33 applies the first brake force F21 to the first brake unit 41, the fourth cable 34 applies the second brake force F22 to the second brake unit 42, the elastic unit 82 provides an elastic force F3 to the moveable member 7, and the elastic force F3 toward the second moveable member position.

When a lever force F1 is applied to the first cable 31 or the second cable 32, the moveable element 7 pulls the third cable 33 and the fourth cable 34 simultaneously. The third cable 33 applies a first brake force F21 to the first brake unit 41. The fourth cable 34 applies a second brake force F22 to the second brake unit 42. The lever force F1 is smaller than the sum of the first brake force F21 and the second brake force F22.

With reference to FIGS. 3A, 3B and 3C, in one embodiment, the elastic unit 82 is disposed in the module housing 81. One end of the elastic unit 82 abuts the module housing 81, and the other end of the elastic unit 82 abuts the moveable member 7. In this embodiment, the elastic unit 82 comprises two springs. The springs are telescoped on the third cable 33 and the fourth cable 34. However, the disclosure is not meant to restrict the invention. For example, the elastic unit 82 can have only one spring, and the spring is disposed between the third cable 33 and the fourth cable 34.

With reference to FIGS. 3B and 3C, in one embodiment, the first brake unit 41 comprises a first elastic element 411, and the second brake unit 42 comprises a second elastic element 421. The first elastic element 411 applies a first recover force F41 to the third cable 33, the second elastic element 421 applies a second recover force F42 to the fourth cable 34, and the elastic force F3 is smaller than the sum of the first recover force F41 and the second recover force F42. When both of the first brake lever 11 and the second brake lever 12 provide no lever force, the moveable member 7 is in the first moveable member position.

Figure 4:
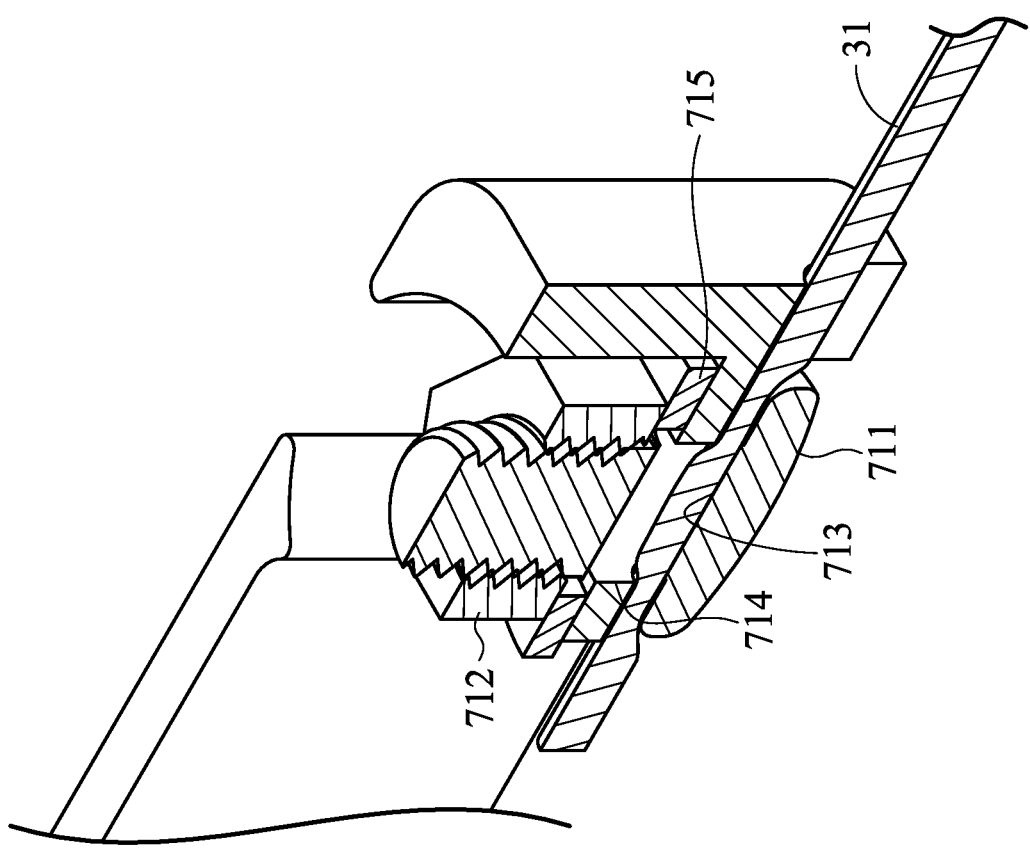
FIG. 4 shows the details of a brake module of a second embodiment of the invention.

With reference to FIGS. 3A and 4, in one embodiment, the brake module B2 further comprises a first bolt 711 and a first nut 712. The first bolt 711 comprises a first bolt through hole 713 (as shown in FIG. 4). The first cable 31 passes through the first bolt through hole 713. The moveable member 7 comprises a first moveable member fastening hole 714. The first bolt 711 is affixed in the first moveable member fastening hole 714 by the first nut 712, and the first cable 31 is affixed by the first bolt 711. In this embodiment, the position of the first cable 31 and the first bolt 711 can be modified, and the tightness of the first cable 31 can be adjusted. Utilizing this embodiment of the invention, the tightness of the second cable 32, the third cable 33 and the fourth cable 34 can also be adjusted in the same way.

With reference to FIGS. 3A and 4, in one embodiment, the brake module B2 further comprises a first gasket 715. The first gasket 715 is sandwiched between the first nut 712 and the moveable member 7. In one embodiment, the first gasket 715 can be made of rubber.

With reference to FIGS. 3A, 3B and 3C, in one embodiment, the brake module B2 further comprises a first sliding base 91 and a second sliding base 92. The first sliding base 91 and the second sliding base 92 are disposed on the module housing 81. The first cable 31 comprises a first cable core 311 and a first cable sheath 312. The second cable 32 comprises a second cable core 321 and a second cable sheath 322. The first cable core 311 passes through the first sliding base 91. The second cable core 321 passes through the second sliding base 92. The first cable sheath 312 abuts the first sliding base 91. The second cable sheath 322 abuts the second sliding base 92. In this embodiment, the first sliding base 91 comprises a first sliding base nut 911, and the second sliding base 92 comprises a second sliding base nut 921. By rotating the first sliding base nut 911, the first cable sheath 312 is pushed and the tightness of the first cable 31 is modified. By rotating the second sliding base nut 921, the second cable sheath 322 is pushed and the tightness of the second cable 32 is modified. Utilizing this embodiment of the invention, the tightness of the third cable 33 and the fourth cable 34 can also be adjusted in the same way.

Figure 5A:
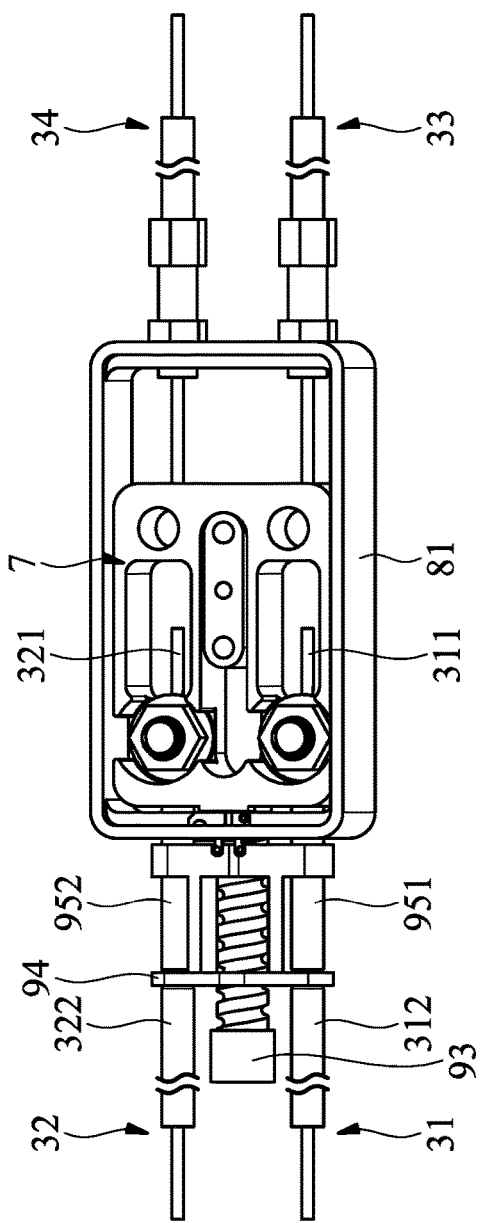
FIGS. 5A and 5B show a brake module of a third embodiment of the invention.
Figure 5B:
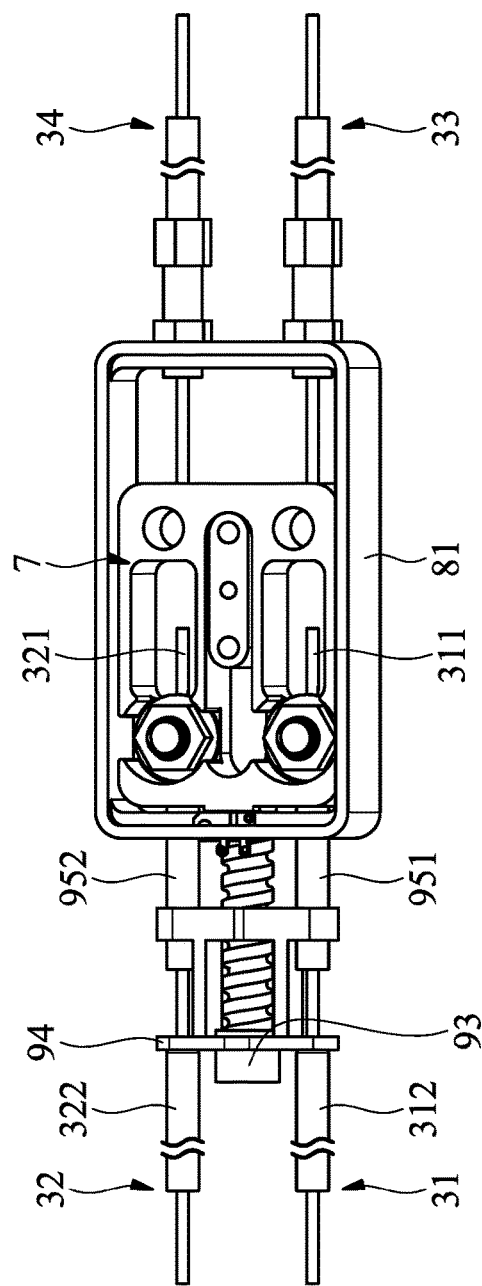

FIGS. 5A and 5B show a brake module B3 of a third embodiment of the invention. With reference to FIGS. 5A and 5B, in the third embodiment, the brake module B3 further comprises a thread rod 93, a bushing 94, a first guiding tube 951 and a second guiding tube 952. The first guiding tube 951 and the second guiding tube 952 are disposed on the module housing 81. The bushing 94 is telescoped on the first guiding tube 951 and the second guiding tube 952. The bushing 94 slides on the first guiding tube 951 and the second guiding tube 952. The thread rod 93 is connected to the bushing 94 and the module housing 81. By turning the thread rod 93, the bushing 94 is moved relative to the module housing 81. The first cable core 311 passes through the first guiding tube 951. The second cable core 321 passes through the second guiding tube 952. The bushing 94 abuts the first cable sheath 312 and the second cable sheath 322 simultaneously. By moving the bushing 94 relative to the module housing 81 to push the first cable sheath 312 and the second cable sheath 322, the tightness of the first cable 31 and the second cable 32 can be modified simultaneously. Utilizing this embodiment of the invention, the tightness of the third cable 33 and the fourth cable 34 can also be adjusted in the same way.

Utilizing the embodiment of the invention, the lever force is smaller than the sum of the first brake force and the second brake force, and the user therefore can brake the wheel with reduced force. Additionally, the user can brake a plurality of wheels by pulling only one brake lever. The brake module of the embodiment can be utilized to walker or other apparatus with wheels.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brake module, comprising:
   a first brake lever;
   a second brake lever;
   a moveable member;
   a first cable, wherein one end of the first cable is connected to the first brake lever, and the other end of the first cable is connected to the moveable member;
   a second cable, wherein one end of the second cable is connected to the second brake lever, and the other end of the second cable is connected to the moveable member;
   a first brake unit, for braking a first wheel;
   a second brake unit, for braking a second wheel;
   a third cable, wherein one end of the third cable is connected to the first brake unit, and the other end of the third cable is connected to the moveable member;
   a fourth cable, wherein one end of the fourth cable is connected to the second brake unit, and the other end of the fourth cable is connected to the moveable member, wherein when a lever force is applied to the first cable or the second cable, the moveable element pulls the third cable and the fourth cable simultaneously, the third cable applies a first brake force to the first brake unit, the fourth cable applies a second brake force to the second brake unit, and the lever force is smaller than a sum of the first brake force and the second brake force; and
   a module housing, wherein the module housing comprises a first fulcrum wall and a second fulcrum wall, the moveable member comprises a first arm, a second arm and third arm, the first cable is connected to the first arm, the second cable is connected to the second arm, the third cable and the fourth cable are connected to the third arm, the first fulcrum wall corresponds to the first arm, and the second fulcrum wall corresponds to the second arm.

2. The brake module as claimed in claim 1, wherein when only the first brake lever is pulled, the first cable pulls the first arm, a second abutting end of the second arm abuts the second fulcrum wall, the moveable member rotates around a second contact point between the second abutting end and the second fulcrum wall, and the third cable and the fourth cable are pulled, and when only the second brake lever is pulled, the second cable pulls the second arm, a first abutting end of the first arm abuts the first fulcrum wall, the moveable member rotates around a first contact point between the first abutting end and the first fulcrum wall, and the third cable and the fourth cable are pulled.

3. The brake module as claimed in claim 2, wherein the first fulcrum wall comprises a first recess, the first abutting end is curved, and when only the second brake lever is pulled, the first abutting end abuts the first recess, and the second fulcrum wall comprises a second recess, the second abutting end is curved, and when only the first brake lever is pulled, the second abutting end abuts the second recess.

4. The brake module as claimed in claim 2, wherein the first arm comprises a first connection hole, the second arm comprises a second connection hole, the third arm comprises a third connection hole and a fourth connection hole, the first cable connects the first connection hole, the second cable connects the second connection hole, the third cable connects the third connection hole, the fourth cable connects the fourth connection hole, a straight distance between the second abutting end and the first connection hole is greater than a straight distance between the second abutting end and the third connection hole, and a straight distance between the first abutting end and the second connection hole is greater than a straight distance between the first abutting end and the fourth connection hole.

5. The brake module as claimed in claim 4, wherein a straight distance between the second abutting end and the first connection hole is greater than a straight distance between the second abutting end and the fourth connection hole, and a straight distance between the first abutting end and the second connection hole is greater than a straight distance between the first abutting end and the third connection hole.

6. The brake module as claimed in claim 2, wherein the module housing comprises a first restriction wall and a second restriction wall, and when only the first brake lever is pulled, the moveable member rotates around the second contact point between the second abutting end and the second fulcrum wall, and the first restriction wall is adapted to abut the third arm to restrict the movement range of the moveable member, and when only the second brake lever is pulled, the moveable member rotates around the first contact point between the first abutting end and the first fulcrum wall, and the second restriction wall is adapted to abut the third arm to restrict a movement range of the moveable member.

7. The brake module as claimed in claim 2, wherein when the first brake lever and the second brake lever are pulled simultaneously, the first cable pulls the first arm, the second cable pulls the second arm, and the moveable member is moved to pull the third cable and the fourth cable.

8. The brake module as claimed in claim 7, wherein the module housing further comprises a third restriction wall, and when the first brake lever and the second brake lever are pulled simultaneously, the moveable member is moved, and the third restriction wall is adapted to abut the moveable member to restrict a movement range of the moveable member.

9. A brake module, comprising:
   a first brake lever;
   a second brake lever;
   a moveable member;

a first cable, wherein one end of the first cable is connected to the first brake lever, and the other end of the first cable is connected to the moveable member;
a second cable, wherein one end of the second cable is connected to the second brake lever, and the other end of the second cable is connected to the moveable member;
a first brake unit, for braking a first wheel;
a second brake unit, for braking a second wheel;
a third cable, wherein one end of the third cable is connected to the first brake unit, and the other end of the third cable is connected to the moveable member;
a fourth cable, wherein one end of the fourth cable is connected to the second brake unit, and the other end of the fourth cable is connected to the moveable member, wherein when a lever force is applied to the first cable or the second cable, the moveable element pulls the third cable and the fourth cable simultaneously, the third cable applies a first brake force to the first brake unit, the fourth cable applies a second brake force to the second brake unit, and the lever force is smaller than a sum of the first brake force and the second brake force; and
a module housing and an elastic unit, wherein the moveable member slides between a first moveable member position and a second moveable member position in the module housing, and when the moveable member is in the first moveable member position, the first brake lever and the second brake lever provided no lever force, and when the moveable member is in the second moveable member position, the third cable applies the first brake force to the first brake unit, the fourth cable applies the second brake force to the second brake unit, the elastic unit provides an elastic force to the moveable member, and the elastic force toward the second moveable member position, wherein the elastic unit is disposed in the module housing, one end of the elastic unit abuts the module housing, and the other end of the elastic unit abuts the moveable member.

10. The brake module as claimed in claim 9, wherein the first brake unit comprises a first elastic element, the second brake unit comprises a second elastic element, the first elastic element applies a first recover force to the third cable, the second elastic element applies a second recover force to the fourth cable, and the elastic force is smaller than a sum of the first recover force and the second recover force.

11. The brake module as claimed in claim 9, further comprising a first bolt and a first nut, the first bolt comprises a first bolt through hole, the first cable passes through the first bolt through hole, the moveable member comprises a first moveable member fastening hole, the first bolt is affixed in the first moveable member fastening hole by the first nut, and the first cable is affixed by the first bolt.

12. The brake module as claimed in claim 11, further comprising a first gasket, wherein the first gasket is sandwiched between the first nut and the moveable member.

13. The brake module as claimed in claim 9, further comprising a first sliding base and a second sliding base, wherein the first sliding base and the second sliding base are disposed on the module housing, the first cable comprises a first cable core and a first cable sheath, the second cable comprises a second cable core and a second cable sheath, the first cable core passes through the first sliding base, the second cable core passes through the second sliding base, the first cable sheath abuts the first sliding base, and the second cable sheath abuts the second sliding base.

14. The brake module as claimed in claim 9, further comprising a thread rod, a bushing, a first guiding tube and a second guiding tube, wherein the first guiding tube and the second guiding tube are disposed on the module housing, the bushing is telescoped on the first guiding tube and the second guiding tube, the bushing slides on the first guiding tube and the second guiding tube, the thread rod is connected to the bushing and the module housing, wherein by turning the thread rod, the bushing is moved relative to the module housing, wherein the first cable comprises a first cable core and a first cable sheath, the second cable comprises a second cable core and a second cable sheath, the first cable core passes through the first guiding tube, the second cable core passes through the second guiding tube, and the bushing abuts the first cable sheath and the second cable sheath simultaneously.

15. A walker, having a first wheel and a second wheel, comprising:
a first brake lever;
a second brake lever;
a moveable member;
a first cable, wherein one end of the first cable is connected to the first brake lever, and the other end of the first cable is connected to the moveable member;
a second cable, wherein one end of the second cable is connected to the second brake lever, and the other end of the second cable is connected to the moveable member;
a first brake unit, for braking the first wheel;
a second brake unit, for braking the second wheel;
a third cable, wherein one end of the third cable is connected to the first brake unit, and the other end of the third cable is connected to the moveable member;
a fourth cable, wherein one end of the fourth cable is connected to the second brake unit, and the other end of the fourth cable is connected to the moveable member, wherein when a lever force is applied to the first cable or the second cable, the moveable element pulls the third cable and the fourth cable simultaneously, the third cable applies a first brake force to the first brake unit, the fourth cable applies a second brake force to the second brake unit, and the lever force is smaller than a sum of the first brake force and the second brake force; and
a module housing, wherein the module housing comprises a first fulcrum wall and a second fulcrum wall, the moveable member comprises a first arm, a second arm and third arm, the first cable is connected to the first arm, the second cable is connected to the second arm, the third cable and the fourth cable are connected to the third arm, the first fulcrum wall corresponds to the first arm, and the second fulcrum wall corresponds to the second arm.

* * * * *